J. P. ARNOLD.
COMBINED PROTECTOR AND IRRIGATOR FOR PLANTS.
APPLICATION FILED JUNE 14, 1917.
1,244,576.
Patented Oct. 30, 1917.
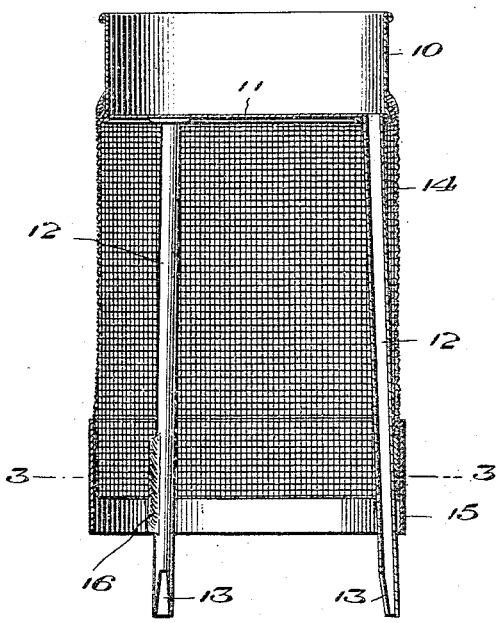
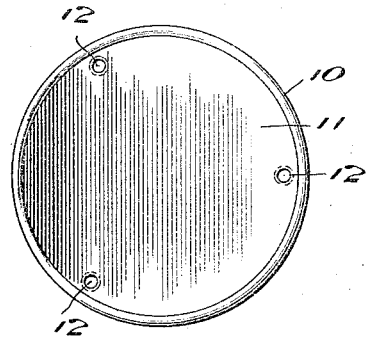
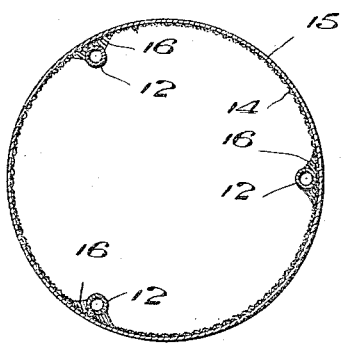
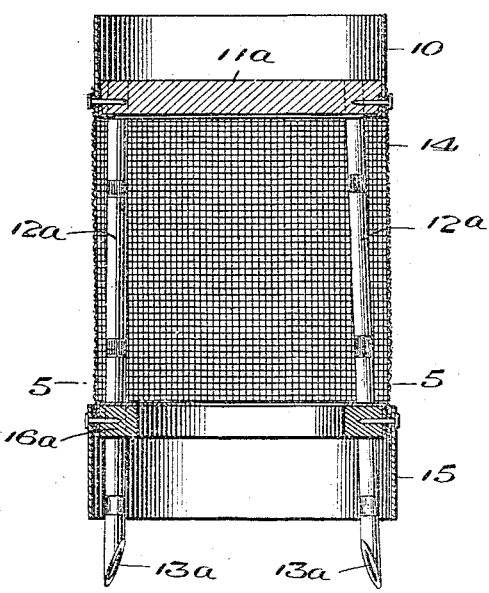
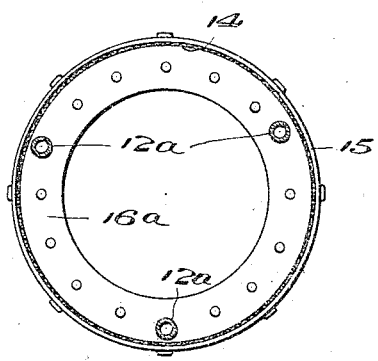
Inventor
John P. Arnold
Witnesses
Philip E. Barnes
M. Sparks
By J. J. Mawhinney
Attorney

UNITED STATES PATENT OFFICE.

JOHN P. ARNOLD, OF BERCLAIR, TEXAS.

COMBINED PROTECTOR AND IRRIGATOR FOR PLANTS.

1,244,576.  Specification of Letters Patent.  Patented Oct. 30, 1917.

Application filed June 14, 1917. Serial No. 174,747.

*To all whom it may concern:*

Be it known that I, JOHN P. ARNOLD, a citizen of the United States, residing at Berclair, in the county of Goliad and State of Texas, have invented certain new and useful Improvements in Combined Protectors and Irrigators for Plants, of which the following is a specification.

The present invention relates to a device for protecting and irrigating plants.

An object of the invention is to provide an inexpensive, simply constructed device adapted to be placed over a plant, and which is supported on legs for engagement in the ground to anchor the protector in place; a device which has a top in the form of a receptacle adapted to contain a quantity of water, or other fluid, which is fed to the roots of the plant below the surface level of the ground through openings in the legs, and thus prevent the baking of the ground by the heat of the sun.

The invention also aims at the provision of a device which collects dew at night and carries it to the roots of the plants beneath the ground; a device which may be quickly and easily removed from plants when sufficiently large not to require attention, and placed over young plants newly set; which may be made in various sizes to accommodate various sized plants, small trees, and the like; a device which may be employed for various other uses, such as a cage for birds, poultry and the like; and a device which supports a covering of wire mesh or other material to ward off insects and protect the plant from cut worms, bugs, insects, large and small animals, the heat of the sun, heavy rain fall, hail, wind and the like.

The above, and various other objects and advantages of this invention will be in part described, and in part understood, from the following detailed description of the present preferred embodiments, the same being illustrated in the accompanying drawing, wherein:

Figure 1 is a vertical section through a combined protector and irrigator for plants constructed according to the present invention.

Fig. 2 is a top plan view of the same.

Fig. 3 is a transverse section taken on the plane indicated by the line 3—3, in Fig. 1, through the lower end of the device.

Fig. 4 is a vertical section taken through a slightly modified form of the device.

Fig. 5 is a transverse section through the lower end of the modified form taken on a plane indicated by the line 5—5 in Fig. 4.

Referring to this drawing, 10 designates the top of the device which is in the form of an open topped receptacle having a bottom 11, and which is adapted to receive water or other fluid therein to be fed to the roots of a plant. The receptacle or top 10 is supported upon one or more legs 12 which are preferably of hollow construction to form passages therethrough, and which are secured at their upper ends through the bottom 11 near the marginal edge thereof, and which communicate with the receptacle to carry off its contents. The legs 12 may be constructed of metal tubing, as shown in Figs. 1, 2, and 3, and the bottom 11 of the receptacle may be formed from sheet metal.

The legs 12 are adapted to be inserted at their lower free ends in the ground about a plant, and are of sufficient length to terminate near the roots of the plant. The lower ends of the legs are provided with openings or slots 13 at their inner sides facing toward the roots of the plant when in position, the slots 13 directing the contents from the receptacle 10 toward the roots.

A body portion or covering 14 of any suitable material, wire meshing being shown in the present instance, is supported about the legs 12 and is substantially of cylindrical form. The upper end of the covering 14 is soldered, or otherwise suitably secured, to the lower end of the receptacle 10, and is provided at its lower end, and about the legs 12, with a preferably metallic skirt or base strip 15 adapted to engage the surface of the ground when the legs are inserted therein. The lower end of the covering 14 is soldered or otherwise suitably secured to the base strip 15, and the legs 12 are preferably soldered to the interior surfaces of the cover 14 and the base strip 15, as shown at 16 in Figs. 1 and 3.

In the modified form, illustrated in Figs. 4 and 5, the receptacle 10 may be provided with a bottom $11^a$ in the form of a disk of wood, and the legs $12^a$ are formed of bamboo, or the like, and are secured at their upper ends through the bottom of the receptacle, and have their lower ends cut off at an angle to form the inwardly facing slots 13ª, and pointed extremities adapted to pierce the ground.

In use, it is only necessary to grasp the upper end of the device, place it over a plant and force the device downwardly to engage the lower ends of the legs 12 in the ground. The hood or covering 14 wards off insects and the like from the plant, and prevents hail from striking the plant. From time to time a quantity of water, or other desired fluid, may be poured into the receptacle 10, and the water is distributed gradually through the legs 12 to the roots of the plant, and beneath the surface level of the ground so that the ground can not become baked or incrustated, and the plant cannot be injured by the force of the water. Heavy rains, dew, and the like, are collected in the receptacle 10, and distributed through the legs to the roots of the plant without injuring the same.

Where the bamboo legs are employed, a retaining ring 16ª, of wood or the like, is used, and is fitted in the base strip 15 and secured thereto by nails or the like, and provided with openings through which the legs may pass. In the modified form the wooden bottom is held within the receptacle 10, and the covering 14 is held to the receptacle by means of nails or the like which pass inwardly through the assembled parts of the device.

It is of course understood that various other changes and modifications may be made in the above specifically described construction of the device, without departing from the spirit of this invention, and being limited only by the scope of the following claims.

What is claimed is:

1. A plant protector including a perforate body, to incase a plant, equipped with a superposed receptacle, and means to carry the contents of said receptacle to a point below said body.

2. In a plant protector, the combination of an inclosing body portion, a receptacle mounted upon the upper end of the body portion, and forming an inclosing top therefor, and supporting legs for the body portion having passages therethrough communicating with said receptacle.

3. In a plant protector, the combination of a vertical frame structure adapted to be placed about a plant, a covering for the frame structure to protect the plant, and a receptacle arranged upon the upper end of the frame structure to form a top therefor, said frame structure having passages therein leading downwardly from the receptacle.

4. In a plant protector, the combination of a receptacle, a plurality of hollow legs projecting downwardly from the receptacle and adapted to be inserted in the ground about a plant to conduct liquid from the receptacle to the roots of the plant, a covering arranged about the receptacle and the legs to inclose and protect the plant, and a base strip secured about the lower end of the covering for contact with the ground to prevent access of worms and the like to the plant.

5. In a plant protector, the combination of a receptacle open at its top to receive a liquid, hollow legs projecting downwardly from the receptacle and communicating therewith and adapted for insertion in the ground to deliver the liquid to the ground beneath the surface level thereof, said legs being adapted to be arranged about a plant and having slots in their inner sides and at their lower ends facing the roots of the plant to direct the liquid toward the roots, and a covering arranged about the legs to protect the plant.

JOHN P. ARNOLD.

Copies of this patent may be obtained for five cents each, by addressing the "Commissioner of Patents, Washington, D. C."